United States Patent Office 2,882,290
Patented Apr. 14, 1959

2,882,290

GRAFT COPOLYMERS CONTAINING AT LEAST THREE COMPONENTS INCLUDING ACRYLONITRILE AND A VINYL PYRIDINE

Harry W. Coover, Jr., and Joseph B. Dickey, Kingsport, Tenn., assignors to Eastman Kodak Company, Rochester, N.Y., a corporation of New Jersey No Drawing. Application July 30, 1954
Serial No. 446,958

7 Claims. (Cl. 260—45.5)

This invention relates to graft copolymers containing at least three components, including acrylonitrile and a vinyl pyridine, and is particularly concerned with graft copolymers of the type formed by graft polymerizing a mixture of monomeric material and preformed polymeric material, the graft copolymers of this invention including a homopolymeric vinyl pyridine portion grafted with a copolymeric portion including a major proportion of acrylonitrile and a minor proportion of at least one other copolymerizable vinylic monomer.

Polymer materials include homopolymers, interpolymers and graft copolymers. The homopolymers are prepared by homopolymerizing a single polymerizable monomer to give a polymeric structure of regularly recurring identical units. Interpolymers are prepared by simultaneously polymerizing mixtures of two or more polymerizable monomers whereby a polymeric structure is built up having random distribution of the component units contributed by the various monomers. Interpolymers include copolymers which are prepared by simultaneously polymerizing two monomers, and terpolymers which are prepared by simultaneously polymerizing three monomers. Graft copolymers, on the other hand, are prepared by first polymerizing one or more monomers to form a preformed homopolymer or interpolymer and then further building up the polymeric structure by polymerizing a mixture of such preformed polymer and one or more monomers.

In this way, a directed structure is obtained with properties quite unlike those of interpolymers or mixtures of polymers involving the same monomers. Thus if a graft copolymer is prepared by homopolymerizing a single monomer and then graft polymerizing a mixture of two monomers with the preformed homopolymer, it can be seen that a portion of the polymer will have a homopolymeric form while the remainder will have a copolymeric form with random distribution of the grafting monomers in the copolymeric portions only, and both the homopolymeric and copolymeric portion will be grafted together into a unitary structure which cannot be separated into its component parts by methods which readily separate the components of polymer mixtures, such as solvent fractionation.

Conversely, the preformed polymer can be a copolymer, terpolymer or other interpolymer of two or more monomers, and the preformed polymer then graft polymerized with a single monomer to give a homopolymeric portion grafted with a copolymeric portion. Other graft polymers are possible wherein both portions grafted together are copolymeric but of different constitution, but this invention is concerned with graft copolymers of the type including a homopolymeric portion of a vinyl pyridine and an interpolymeric portion of a major proportion of acrylonitrile with a minor proportion of at least one other monomer.

Heretofore fibers of unmodified polyacrylonitrile have been spun which have excellent physical properties such as high strength high sticking temperature, and good resistance to shrinkage at elevated temperatures. However, such unmodified polyacrylonitrile fibers show low moisture absorption and poor dyeability with most presently available dyes. For a great many textile purposes, improved dyeability of acrylonitrile type fibers would be highly desirable.

Attempts have been made to increase the dyeability of shaped polyacrylonitrile articles such as fibers by interpolymerizing acrylonitrile with certain monomers whose polymers have an affinity for dyes. While such procedures do give polymer products, from which fibers having improved dyeing properties can be obtained, they may introduce unwanted properties as, for example, a substantial lowering of the softening point of the fiber.

It is known that greatly increased moisture absorption and dyeability of acrylonitrile polymer fibers can be obtained by copolymerizing acrylonitrile with certain hydrophilic monomers such as acids, amides, esters, etc., which contain an unsaturated ethylene linkage. The improvement in these properties varies with type and amount of the monomer copolymerized with acrylonitrile. When an amount of the modifying compound has been copolymerized with acrylonitrile, sufficient to give desirable moisture absorption and dyeability, it is usually found that the resulting fibers have such low sticking temperatures and high shrinkage at elevated temperatures that they are not suitable for most textile purposes. For example, when acrylonitrile is copolymerized with 15 to 25% vinyl pyridine, the resulting fibers show good moisture absorption and dyeability, but their sticking temperature is too low being approximately 150° C., and they will shrink about 50% in length in boiling water. Polyacrylonitrile fibers on the other hand, with no modifier have a sticking temperature of 200° C. or higher, and will shrink only about 5% in boiling water, but, as mentioned previously, they will not dye effectively.

The amount of reduction in sticking temperature and increase in shrinkage at elevated temperatures of fibers obtained from copolymers of acrylonitrile and hydrophilic monomers varies with the amount and type of modifying monomer, but a loss in these two desirable properties of polyacrylonitrile fibers by copolymerization is usually the case.

Polyacrylonitrile can also be modified by the mechanical mixing of other hydrophilic polymers with it such as acids, amides, esters, etc., to improve dye affinity and moisture absorption. However, solutions of mechanical mixtures of polyacrylonitrile with other hydrophilic polymers are usually incompatible. These incompatible solutions are difficult to spin into fibers having good physical properties. Further, the fibers obtained from these incompatible mixtures tend to have low softening points and may stiffen badly in the dye bath.

An object, therefore, of the present invention is to provide acrylonitrile polymer compounds which are modified in structure so as to possess improved physical and chemical properties.

Another object of the invention is to provide methods for making these modified acrylonitrile polymer compounds.

Still another object is to provide homogeneous solutions containing modified acrylonitrile-containing polymers. Another object is to provide fibers from these homogeneous solutions which have low shrinkage and improved dyeability and methods for making the fiber.

Other objects will be apparent from the description and claims which follow.

The graft copolymers of this invention contain (a)

5–95% by weight of a homopolymeric portion of a vinyl pyridine of the formula:

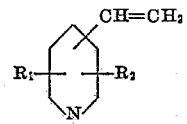

wherein $R_1$ and $R_2$ are hydrogen or alkyl groups of 1–4 carbon atoms, and (b) 95–5% by weight of an interpolymeric portion grafted with the homopolymeric portion and consisting of a major portion, preferably 85–99.5% by weight, of acrylonitrile and a minor proportion, preferably 15–0.5% by weight, of at least one other polymerizable vinylic monomer characterized by a single —CH=C< group and preferably a $CH_2$=S< group. The graft copolymers embodying the invention are prepared in accordance with the inventive process by first polymerizing one of (a) or (b) to form the preformed polymer and then admixing the preformed polymer with the other of (a) and (b) and polymerizing the resulting polymer-monomer mixture. Thus, the vinyl pyridine monomer (a) can be homopolymerized and mixture (b) of acrylonitrile and other vinylic monomer graft polymerized therewith, or the mixture (b) can be interpolymerized first and the vinyl pyridine monomer graft polymerized therewith. In either case, the graft copolymer produced thereby consists of a homopolymeric portion of the vinyl pyridine grafted with a copolymeric portion comprised predominantly of acrylonitrile with a minor proportion of other vinylic material. In the graft copolymers of the invention, the acrylonitrile in combined form amounts to at least 5% of the total polymer weight as does the polymerized vinyl pyridine. The graft copolymers which are preferred for fiber manufacture are those which contain at least 60% by weight of combined acrylonitrile. Such polymers have the desirable characteristics of acrylonitrile polymers and also the properties imparted by the other monomer and the vinyl pyridine monomer. The vinyl pyridine portion of the polymer greatly enhances the dyeability of the polymer, and the use of another vinylic monomer with the acrylonitrile modifies the properties of the interpolymeric portion of the polymer so as to obviate objectionable unevenness in the dyeing.

The polymers of this invention are desirably formed by effecting the graft polymerization without isolating the preformed polymer from the polymerization mixture in which it was formed, although the use of isolated preformed polymers is also within the scope of the invention. Polymers embodying the invention have excellent solubility properties and can be readily spun into fibers having excellent mechanical and chemical characteristics including higher softening points and better solubility and dyeability properties than other polymers having the same overall composition prepared by the prior art methods mentioned above. The dyed fibers of polymers embodying this invention have yarn color much superior to that of dyed fibers prepared from unmodified acrylonitrile polymers.

The vinyl pyridine used in practicing this invention can be an unsubstituted vinyl pyridine of the formula

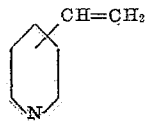

such as 2-vinyl pyridine, 4-vinyl pyridine, or 6-vinyl pyridine; a substituted 2-vinyl pyridine of the formula

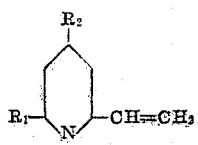

such as 2-vinyl 4-methyl pyridine, 2-vinyl 6-methyl pyridine, or the like; a substituted 4-vinyl pyridine of the formula

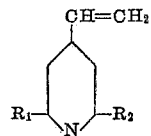

such as 2-methyl 4-vinyl pyridine or the like; or a substituted 5-vinyl pyridine of the formula

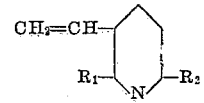

preferably a 2-alkyl 5-vinyl pyridine of the formula

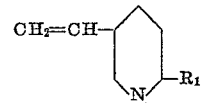

In each of the formulas, $R_1$ and $R_2$ are either hydrogen or an alkyl group of from 1 to 4 carbon atoms. Thus the alkyl substituent groups can be methyl, ethyl, n-propyl, isopropyl, or butyl within the scope of this invention.

In referring to the homopolymeric portion of the polymers of the invention, it will be understood that this portion contains no material other than a vinyl pyridine monomer as defined but it can include two or more vinyl pyridines. The term "vinyl pyridine" employed herein is intended to include both the substituted and unsubstituted vinyl pyridines as disclosed; and, if no ring substituents other than the vinyl group are intended, this will be specifically indicated. The graft copolymers contain at least 5% by weight of combined acrylonitrile together with at least 5% by weight of a vinyl pyridine. The copolymeric portion desirably forms from 55 to 95% of the polymer weight and the homopolymeric portion from 5 to 45% of the polymer weight.

The interpolymeric material (b) can consist of acrylonitrile and any one or more of the vinylic monomers containing a —CH=C< group including the acrylamides (including methacrylamides), $C_4$–$C_{21}$ diamides of dicarboxylic acids of 4–5 carbon atoms such as maleamides, fumaramides, itaconamides and citraconamides, $C_4$–$C_{17}$ ester-amides of dicarboxylic acids of 4–5 carbon atoms such as maleamates, fumaramates, citraconamates and itaconamates, vinyl esters of monocarboxylic acids, acrylates, vinyl pyridines, vinylic halides such as vinyl chloride and vinylidene chloride, aryl vinyls such as styrene, α-methyl styrene, p-acetamino styrene, and α-acetoxy styrene, vinyl ethers such as ethyl vinyl ether and isopropyl vinyl ether, vinyl ketones such as isopropenyl methyl ketone, methyl vinyl ketone, ethyl vinyl ketone and ethyl isopropenyl ketone, unsaturated acids such as acrylic acid, methacrylic acid and the like, esters such as dimethyl maleate, diethyl maleate, diisopropyl maleate, dimethyl fumarate, diethyl fumarate, diisopropyl fumarate and the like, as well as such other vinylic monomers as fumaronitrile, methacrylonitrile, N-vinyl phthalimide, ethylene and similar materials have a monoethylenic unsaturation.

As acrylamides, we can advantageously use in our invention those represented by the following general formula:

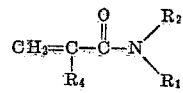

wherein $R_1$ and $R_2$ each represents a hydrogen atom or an alkyl group containing from 1 to 4 carbon atoms (e.g. methyl, ethyl, propyl, isopropyl, butyl, isobutyl, etc., groups) and $R_4$ represents a hydrogen atom or a methyl group. Typical acrylamides include, for example, acrylamide, N-methylacrylamide, N-ethylacrylamide, N-isopropylacrylamide, N-n-butylacrylamide, N,N-dimethylamide, N,N - diethylacrylamide, methacrylamide, N-methylmethacrylamide, N-ethyl-methacrylamide, N-isopropylmethacrylamide, N,N - dimethylmethacrylamide, etc.

As maleamides, we can advantageously use those represented by the following general formula:

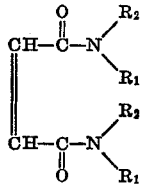

wherein $R_1$ and $R_2$ each have the values given above. Typical maleamides include, for example, maleamide, N-methylmaleamide, N-ethylmaleamide, N-propylmaleamide, N - isopropylmaleamide, N - n - butylmaleamide, N,N'-dimethylmaleamide, N,N'-diethylamaleamide, N,N'-di-n-butylmaleamide, N,N'-methylethylmaleamide, N,N'-tetramethylmaleamide, N,N'-tetraethylmaleamide, N,N'-dimethyl-N,N'-diethylmaleamide, etc.

As fumaramides, we can advantageously use those represented by the following general formula:

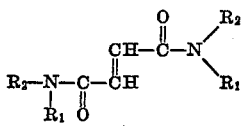

wherein $R_1$ and $R_2$ each have the values given above. Typical fumaramides include, for example, fumaramide, N-methylfumaramide, N-ethylfumaramide, N-propylfumaramide, N-isopropylfumaramide, N-n-butylfumaramide, N,N'-dimethylfumaramide, N,N'-diethylfumaramide, N,N'-di-n-butylfumaramide, N-ethyl-N'-methylfumaramide, N - n - butyl - N'-methylfumaramide, N,N'-tetramethylfumaramide, N,N' - tetraethylfumaramide, N,N-diethyl-N',N'-dimethylfumaramide, etc.

As itaconamides, we can advantageously employ those represented by the following general formula:

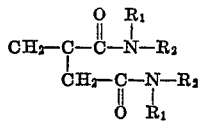

wherein $R_1$ and $R_2$ each have the values given above. Typical itaconamides include, for example, itaconamide, N-methylitaconamide, N-ethylitaconamide, N-propylitaconamide, N,N'-dimethylitaconamide, N,N'-diethylitaconamide, etc.

As citraconamides, we can advantageously employ those represented by the following general formula:

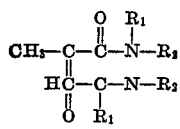

wherein $R_1$ and $R_2$ each have the values given above. Typical citraconamides include, for example, citraconamide, N-methylcitraconamide, N-ethylcitraconamide, N - n - butylcitraconamide, N,N' - dimethylcitraconamide, N,N'-diethylcitraconamide, the N,N'-butylcitraconamides, N,N'-tetramethylcitraconamide, etc.

The maleamates useful in practicing our invention comprise those represented by the following general formula:

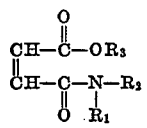

wherein $R_1$ and $R_2$ each have the values given above, and $R_3$ represents an alkyl group of from 1 to 4 carbon atoms (e.g., methyl, ethyl, propyl, isopropyl, n-butyl, isobutyl, etc.). Typical are methyl maleamate, propyl maleamate, N-methyl methyl maleamate, N-ethyl methyl maleamate, the N-butyl methyl maleamate, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously employ those represented by the following general formula:

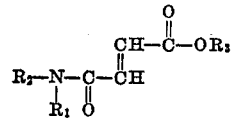

wherein $R_1$, $R_2$ and $R_3$ each have the values given above. Typical are methyl fumaramate, ethyl fumaramate, propyl fumaramate, n-butyl fumaramate, methyl N-methylfumaramate, ethyl N-methylfumaramate, the butyl N-methylfumaramates, methyl N-dimethylfumaramates, ethyl N - dimethylfumaramates, n - butyl N - dimethylfumaramate, the methyl N-dibutylfumaramates, etc.

As itaconamates, we can advantageously employ those represented by the following general formulas:

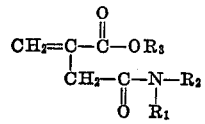

and

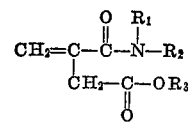

wherein R, $R_1$ and $R_3$ each have the values given above. Typical itaconamates include, for example, methyl itaconamate, ethyl itaconamate, propyl itaconamate, the butyl itaconamates, methyl N-methylitaconamate, ethyl N-methylitaconamate, propyl N-methylitaconamate, n-butyl N-methylitaconamate, methyl N-dimethylitaconamate, ethyl N-dimethylitaconamate, n-butyl N-dimethylitaconamate, the methyl N-dibutylitaconamates, etc.

As citraconamates, we can advantageously employ those represented by the following general formulas:

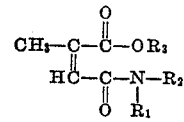

and

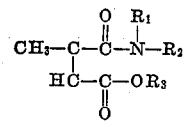

wherein $R_1$, $R_2$ and $R_3$ each have the values given above. Typical citraconamates include, for example, methyl citraconamate, ethyl citraconamate, propyl citraconamate, the butyl citraconamates, methyl N-methylcitraconamate, ethyl N-methylcitraconamates, propyl N-methylcitraconamates, n-butyl N-methylcitraconamate, methyl N-dimethylcitraconamate, ethyl N-dimethylcitraconamate, n-butyl N-dimethylcitraconamate, the methyl N-dibutylcitraconamates, etc.

As acrylates, we can advantageously employ those represented by the following general formula:

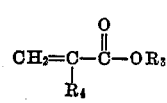

wherein $R_3$ has the values given above and $R_4$ represents a hydrogen atom, a methyl group, or an ethyl group. Typical acrylates include, for example, methyl acrylate, ethyl acrylate, propyl acrylate, isopropyl acrylate, butyl acrylate, methyl methacrylate, ethyl methacrylate, propyl methacrylate, n-butyl methacrylate, isopropyl methacrylate, methyl ethacrylate, ethyl ethacrylate, etc.

As vinyl esters, we can advantageously employ those represented by the following general formula:

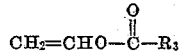

wherein $R_3$ has the values given above. Typical vinyl esters include, for example, vinyl acetate, vinyl propionate, vinyl butyrate, vinyl isobutyrate, etc.

The following examples will serve to illustrate the principles involved in our invention, but are not intended to limit the scope of the invention unless otherwise specifically indicated.

*Example 1*

Ten grams of 2-methyl-5-vinylpyridine was emulsified in 190 g. of water containing 1.0 g. of sodium lauryl sulfate, 0.02 g. of potassium persulfate, and 0.02 g. of potassium metabisulfite. The resulting mixture was allowed to polymerize at 25° C. for 24 hours, at which time titration for residual 2-methyl-5-vinylpyridine monomer indicated that conversion to polymer was essentially complete. There were then added 1,000 ml. of distilled water, 80 g. of acrylonitrile, 3 g. of vinyl acetate, 0.8 g. of potassium persulfate, and 0.8 g. of potassium metabisulfite. The polymerization mixture was heated at 35° for 6 hours, at which time titration for unreacted acrylonitrile indicated that the polymerization was essentially complete. The isolated polymer was readily soluble in dimethylformamide and was spun into fibers which had excellent affinity for acid type dyes.

*Example 2*

Ten grams of 2-methyl-5-vinylpyridine was emulsified in 190 g. of water containing 1.0 g. of sodium lauryl sulfate, 0.02 g. of potassium persulfate, and 0.02 g. of potassium metabisulfite. The resulting mixture was allowed to polymerize at 25° C. for 24 hours at which time titration for residual 2-methyl-5-vinylpyridine monomer indicated that the conversion to polymer was essentially complete. There were then added 360 ml. of distilled water, 28.5 g. of acrylonitrile, 1.5 g. of N-methylmethacrylamide, 0.3 g. of potassium persulfate, and 0.3 g. of potassium bisulfite, and the polymerization mixture was heated at 35° C. for an additional 15 hours. The precipitated polymer was obtained in 90% yield. Fibers spun from a dimethylformamide solution of the polymer had an extensibility of 30% and showed excellent affinity for acid type dyes.

*Example 3*

Two grams of 2-methyl-5-vinylpyridine was emulsified in 30 g. of water containing 0.2 g. of sodium lauryl sulfate, 0.015 g. of potassium persulfate, and 0.015 g. of potassium metabisulfite. The resulting mixture was allowed to polymerize at 25° for 24 hours at which time the conversion to polymer was essentially complete. There were then added 330 g. of distilled water, 26 g. of acrylonitrile, 4 g. of vinylidene chloride, 0.3 g. of potassium persulfate, and 0.3 g. of potassium metabisulfite. The polmerization mixture was heated at 35° C. for 15 hours. The resultant precipitated polymer was isolated by filtration. It was readily soluble in dimethylformamide and was spun into fibers which had excellent affinity for acid wool dyes.

*Example 4*

28.5 g. of acrylonitrile and 1.5 g. of itaconamide were emulsified in 400 cc. of distilled water having dissolved therein 0.3 g. of potassium persulfate, 0.3 g. of potassium metabisulfite, 1.5 g. of phosphoric acid, and 1.5 g. of sodium lauryl sulfate. The emulsion was heated at 35° C. for 10 hours. There were then added 5 g. of 2-methyl-5-vinylpyridine, 0.05 g. of potassium persulfate, and 0.05 g. of potassium metabisulfite, and heating was resumed for an additional 24 hours at 35° C. The precipitated polymer was isolated by filtration and was readily soluble in dimethylformamide. It was spun into fibers which, when completely relaxed, had an extensibility of 27% and a high affinity for acid type dyes.

*Example 5*

Ten grams of 2-methyl-5-vinylpyridine was added to a solution of 0.02 g. of potassium persulfate, 0.02 g. of potassium metabisulfite, and 1.0 g. of sodium lauryl sulfate in 190 ml. of water, and the reaction mixture was heated at 25° C. for 10 hours. To the resultant emulsion were added 300 ml. of distilled water, 38 g. of acrylonitrile, 1.0 g. of 2-methyl-5-vinylpyridine, 1.0 g. of isopropyl N-methylcitraconamate, 0.5 g. of potassium persulfate, and 0.6 g. of potassium metabisulfite. The polymerization mixture was heated at 35° C. for 15 hours. The isolated polymer was readily soluble in dimethylformamide and was spun into fibers which had excellent affinity for acid type dyes.

Similar results are obtained with any of the other polymeric materials defined herein. When the vinyl pyridine monomer is employed to form the preformed polymer, the polymerization can be carried substantially to completion or stopped at any desired conversion as, for example, from 70–90%. When the preformed polymer thus formed is not isolated prior to the graft polymerization, any unreacted vinyl pyridine monomer present interpolymerizes with the acrylonitrile during the grafting step. When the reverse process is employed, and the acrylonitrile and other monomer we used to form the preformed polymer, the polymerization must be carried substantially to completion or the interpolymer isolated before the graft polymerization to produce the modified polymers of this invention.

The polymerization is advantageously carried out in an aqueous medium, although other reaction media, such as organic solvents, can be employed; for example, a polymerization medium consisting of aqueous acetone, or other aqueous solvent can be used.

The polymerizations can be accelerated by the use of a well-known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.) hydrogen peroxide, perborates (e.g. alkali metal perborates, such as those of sodium and potassium, etc.) persulfate (e.g. alkali metal ammonium persulfate etc.). Other catalysts such as the ketazines, azines, etc. can be used. The quantity of catalyst used can be varied, depending on the monomer, amount of diluent, etc. Sufficient catalyst can be used to polymerize the pyridine monomers selected from those represented by the above general formulas as well as the added mixture containing monomeric acrylonitrile, or an amount of catalyst sufficient to polymerize only the pyridine monomers can be used, and additional catalyst can be added with the mixture containing acrylonitrile monomer to complete the polymerization. The catalyst added along with acrylonitrile may be the same catalyst that was used to polymerize the pyridine monomers. We have found that it is especially advantageous to use an amount of catalyst sufficient to interpolymerize only the initial monomers, and then upon addition of the grafting monomer or monomers to add a further amount of catalyst at that time. This procedure provides a readier means for regulating the molecular weight distribution of the polymer composition.

The temperatures at which the process of our invention can be carried out vary from ordinary room temperature to the reflux temperature of the reaction mixture. Generally a temperature of from 25° to 75° C. is sufficient. It is desirable to cool the initial polymerization mixture somewhat before adding the monomeric material.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated esters, etc.

The polymerization can be carried out in the presence of chain regulators, such as hexyl, octyl, lauryl, dodecyl, myristyl mercaptans, etc. which impart improved solubility properties to the polymer compositions. If desired, reducing agents such as alkali metal bisulfites (e.g. potassium, sodium, etc. bisulfites) can be added to reduce the time required for the polymerization to be effected.

The polymerization in the second or grafting step can be either partial or complete as desired. In the case of batch processes, the polymerization in the second step is desirably substantially complete in order to avoid the necessity of separating unreacted acrylonitrile from the graft polymer. If desired, however, the polymerization can be stopped at any desired point, even in the case of a batch process. When the processing is effected in continuous fashion, it is not necessary to carry the polymerization to completion, since the reaction monomer can be recycled in the process. In some cases, it is desirable to carry out the second step polymerization to a conversion of from about 60 to 90%, since the polymer thereby obtained possesses particularly desirable solubility characteristics.

Although the invention has been described in considerable detail with particular reference to certain preferred embodiments thereof, variations and modifications can be effected within the spirit and scope of the invention as described herein, and as defined in the appended claims.

This application is a continuation-in-part of our copending application, Serial No. 268,340, filed January 25, 1952, now abandoned.

We claim:
1. A graft copolymer of (a) a preformed homopolymer of a vinyl pyridine having the formula

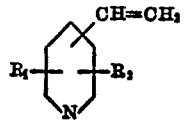

wherein $R_1$ and $R_2$ are members of the group consisting of hydrogen and alkyl groups of 1–4 carbon atoms graft copolymerized with (b) a mixture of monomers consisting of 85–99.5% by weight of acrylonitrile and 15–0.5% by weight of at least one different monoethylenically unsaturated polymerizable monomer from the group consisting of (1) vinylidene chloride, (2) vinyl chloride, (3) vinyl esters of monocarboxylic acids of 2–5 carbon atoms, (4) alkyl acrylates and methacrylates wherein the alkyl group contains 1–4 carbon atoms, (5) unsubstituted and N-alkyl substituted acrylamides, methacrylamides, maleamides, fumaramides, itaconamides and citraconamides wherein each alkyl group contains 1–4 carbon atoms, (6) alkyl esters of unsubstituted and N-alkyl substituted maleamates, fumaramates, itaconamates, and citraconamates wherein each alkyl group contains 1–4 carbon atoms, (7) vinyl pyridines as defined hereinabove, and (8) styrene, said acrylonitrile amounting to at least 60% and said vinyl pyridine amounting to at least 5%, in graft copolymerized form, of the total weight of said graft copolymer, the remainder of said graft copolymer being composed of said different monomer in graft copolymerized form.

2. A graft copolymer in accordance with claim 1 wherein the preformed homopolymer is poly-2-methyl-5-vinyl pyridine.

3. A graft copolymer in accordance with claim 1 wherein the preformed homopolymer is poly-2-vinyl pyridine.

4. A graft copolymer in accordance with claim 1 wherein the different monomer is N-methyl methacrylamide.

5. A graft copolymer in accordance with claim 1 wherein the different monomer is vinyl acetate.

6. A graft copolymer in accordance with claim 1 wherein the different monomer is vinylidene chloride.

7. Fiber of a graft copolymer as defined in claim 1.

References Cited in the file of this patent
UNITED STATES PATENTS

| | | |
|---|---|---|
| 2,527,863 | Webb | Oct. 31, 1950 |
| 2,538,779 | Harrison et al. | Jan. 23, 1951 |
| 2,614,089 | Harrison et al. | Oct. 14, 1952 |
| 2,620,324 | Coover et al. | Dec. 2, 1952 |
| 2,746,943 | Pritchard | May 22, 1956 |
| 2,749,325 | Craig | June 5, 1956 |

FOREIGN PATENTS

| | | |
|---|---|---|
| 680,359 | Great Britain | Oct. 1, 1952 |

OTHER REFERENCES

J. Polymer Science, volume 8, pages 257–277, esp. page 260 (1952).